United States Patent [19]
Flanagan

[11] Patent Number: 6,163,569
[45] Date of Patent: Dec. 19, 2000

[54] SPLIT-ARCHITECTURE MODEM

[75] Inventor: Richard Thomas Flanagan, Freehold, N.J.

[73] Assignee: Lucent Technologies, Inc., Murray Hill, N.J.

[21] Appl. No.: 09/136,257

[22] Filed: Aug. 19, 1998

[51] Int. Cl.[7] .............................. H04B 1/38; H04L 5/16
[52] U.S. Cl. .......................................... 375/222; 370/469
[58] Field of Search .............................. 375/222; 370/469

[56] References Cited

U.S. PATENT DOCUMENTS

| | | | |
|---|---|---|---|
| 4,455,661 | 6/1984 | Qureshi | 375/222 |
| 4,821,265 | 4/1989 | Albal et al. | 370/469 |
| 5,384,780 | 1/1995 | Lomp et al. | 370/238 |
| 5,598,410 | 1/1997 | Stone | 370/469 |
| 5,619,650 | 4/1997 | Bach et al. | 709/246 |
| 5,636,140 | 6/1997 | Lee et al. | 370/469 |
| 5,872,972 | 2/1999 | Boland et al. | 709/102 |
| 6,011,803 | 1/2000 | Bicknell et al. | 370/467 |

*Primary Examiner*—Stephen Chin
*Assistant Examiner*—Lenny Jiang
*Attorney, Agent, or Firm*—John A. Caccuro

[57] ABSTRACT

A split-architecture modem splits the physical layer protocol into a logical operations portion and a signal processing portion. A first processor (e.g., a general purpose processor (GPP)) of the modem performs the logical operations of the physical layer protocol along with the data link layer protocol. A second processor (e.g., a digital signal processor (DSP)) of the modem performs the signal processing portion of the physical layer protocol.

10 Claims, 6 Drawing Sheets

SPLIT-ARCHITECTURE MODEM

TECHNICAL FIELD OF THE INVENTION

This invention relates to modems and, more particularly, to a split-architecture modem that utilizes different processors to perform bit processing and signal processing functions.

BACKGROUND OF THE INVENTION

Typically a modem implements two layers of the network reference model as defined by the International Standards Organization (ISO): the physical layer and the data-link layer. A modem typically uses either one or two processors to process the physical layer and the data-link layer. A two processor arrangement is illustrated in FIG. 1, where a controller 101 performs the Data-Link layer functions and a data-pump 102 performs the Physical layer functions. Typically the controller 101 is implemented using a microprocessor, while the data-pump 102 is implemented using a Digital Signal Processor (DSP).

In both the single and two processor implementations, the cost of a modem is dependent on memory organization. The disposition of memory is often referred to as the memory hierarchy. The memory hierarchy refers to a memory system that contains both fast and slow memory. Usually the amount of fast memory is relatively small in proportion to the slow memory.

The memory system is designed so that the fast memory is referenced proportionally more often than the slower memory, substantially giving the overall modem the speed characteristics of a fast memory system. For a constant level of performance, a modem with a well-designed memory hierarchy is less expensive than a modem without this memory design.

General-purpose processors (GPP) typically are designed to work in a modem utilizing a memory hierarchy. They can have a small amount of fast cache memory that dynamically saves code and data the program is using. In comparison, DSPs do not typically employ dynamic cache memories, using, instead, dedicated RAM for memory storage. However, DSPs using dedicated RAM process data faster than GPPs, since no cycles are wasted in fetching instructions and data from slower memory.

A single-processor modem implementation that executes on a DSP typically has all of the memory high in the memory hierarchy. This provides the required speed but is expensive. In comparison, a single-process modem implementation that executes on a general-purpose processor use memory efficiently, but is slower and requires more processing cycles due to repeatedly loading/unloading fast memory with the required instructions and data located in slower memory.

SUMMARY OF THE INVENTION

My invention is directed to a split-architecture modem which splits the physical layer protocol into a logical operations portion and a signal processing portion. A first processor (e.g., a GPP) performs the logical operations of the physical layer protocol along with the data link layer protocol. A second processor (e.g., a DSP) performs the signal processing portion. Logical operations are defined here as operations that execute relatively efficiently on the first processor and include searching, sorting, logical functions (AND, OR, EXCLUSIVE OR) and state-machine control. Signal processing operations are defined here as operations that execute relatively efficiently on the second processor and include operations such as convolution, inner products, and adaptive filtering.

More specifically, my modem comprises a first processor for processing modem data link layer protocols and at least one logical operation selected from a physical layer protocol and a second processor for processing the remaining physical layer protocol. The first processor performs logical operations of the physical layer protocol such as modem state control, scrambling/descrambling, coding/decoding, and mapping/demapping. The second processor performs the signal processing functions of the physical layer protocol such as transmit/receive filtering, adaptive equalization, adaptive echo canceling, timing recovery, and carrier recovery. An interface enables data symbol communications between the first processor to the second processor.

GENERAL DESCRIPTION

Figure 1:
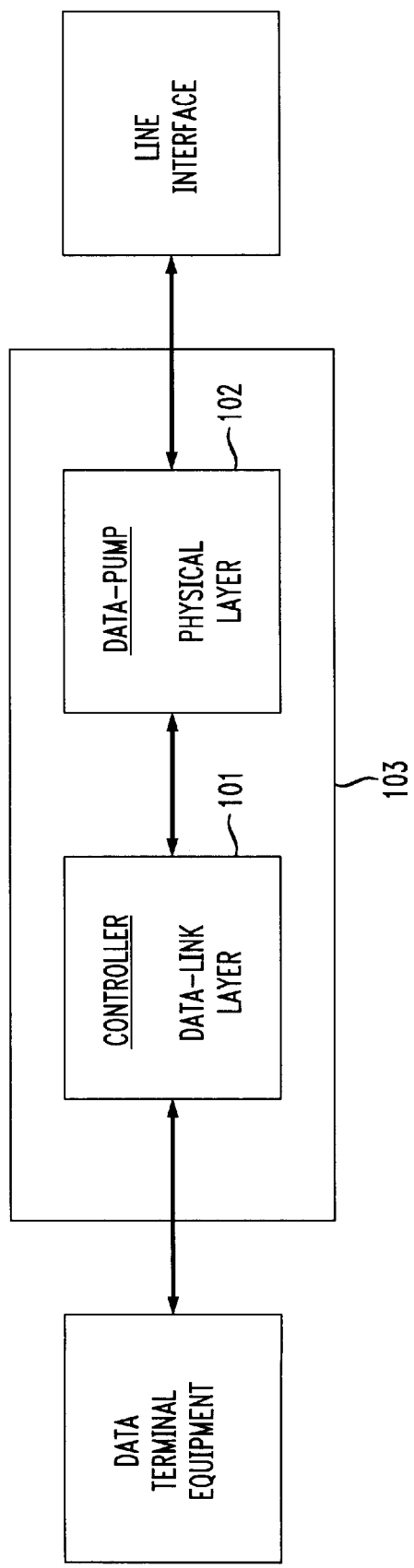
FIG. 1 shows an illustrative block diagram of a prior art two processor modem.

In the following description, each item or block of each figure has a reference designation associated therewith, the first number of which refers to the figure in which that item is first described (e.g., 101 is first described in FIG. 1).

As previously noted, when data modems are implemented using software, they typically utilize a single process (or "thread") of execution where a single state machine controls the execution of the algorithms required to modulate and demodulate data. My invention is directed to a split-architecture modem that splits this single process into two processes which, unlike the prior art shown in FIG. 1, does not use the natural separation of the data link and physical layers as the basis for assigning the processes to processors for execution. In contrast, my invention splits the single physical-layer process into a logical operation portion and a signal processing portion. A first processor (hereinafter referred to as a GPP) performs the logical operations, such as bit processing and modem state machine control, while a second processor (hereinafter referred to as a DSP) performs signal processing operations, such as filtering.

As previously discussed, the consolidation of all of the functions of the data-pump together with those of the controller function is known. For example, in the prior art a single processor has been used to consolidate both the controller and the data-pump functions. These functions can be executed together on a single processor when the resources (memory and execution speed) allow.

Figure 2:
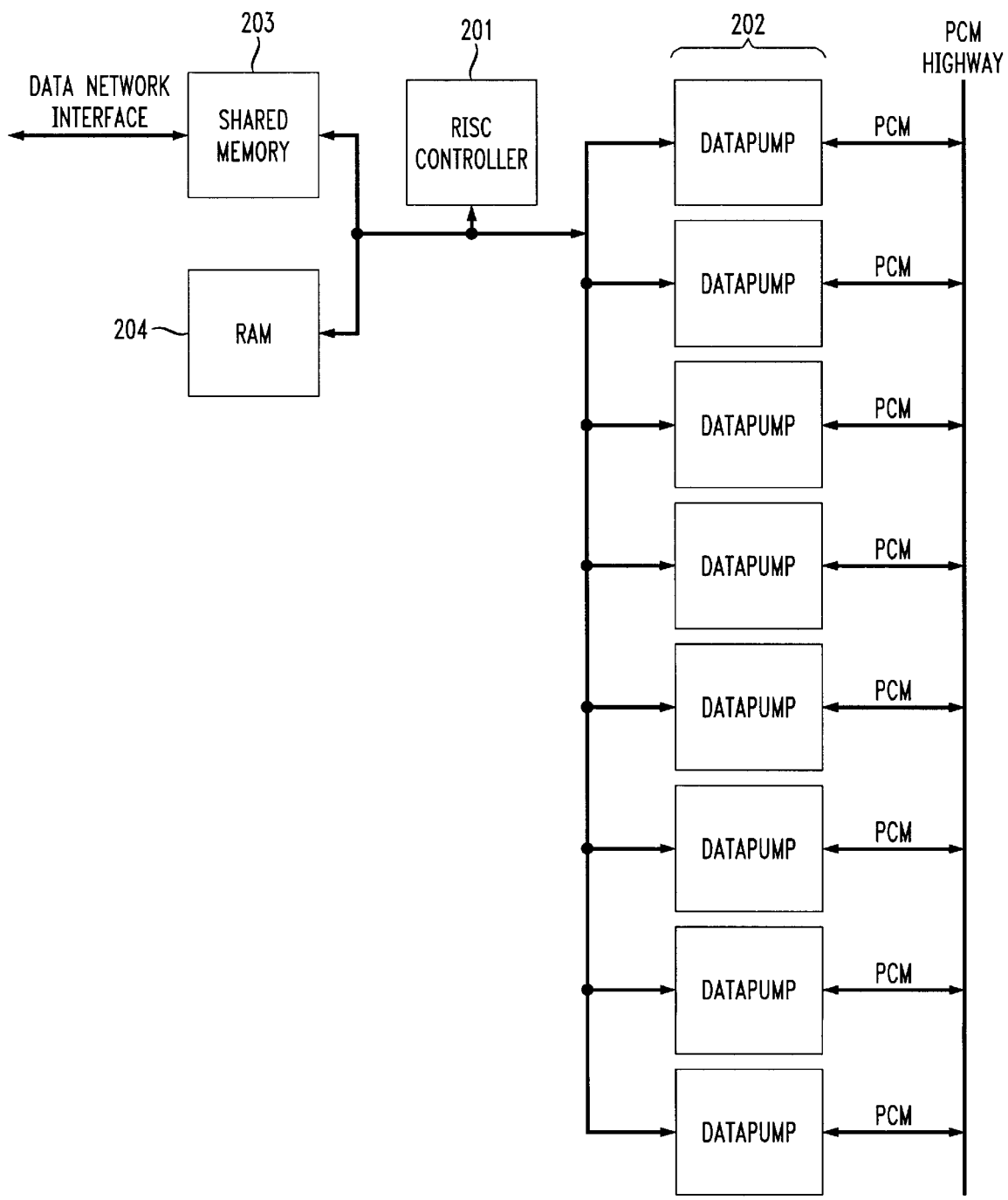
FIG. 2 shows an illustrative block diagram of a prior art multi-port modem.

Consolidation of controller functions for a multiple modem arrangement is also known, e.g. see the multi-port modem design available from RSA Communications. As illustrated in FIG. 2, in some Remote Access Server (RAS) applications multi-port modems 200 are implemented using a single reduced instruction code (RISC) controller 201 to implement the controller functionality for a number of data-pump processors 202. In such an implementation, the program memory 203 and RAM 204 requirements for the RISC controller 201 is shared across all data-pump processors 202. Since the RISC controller 201 is a high-performance microprocessor, it can perform the functions normally required using a separate controller for each data-pump 202.

Figure 3:
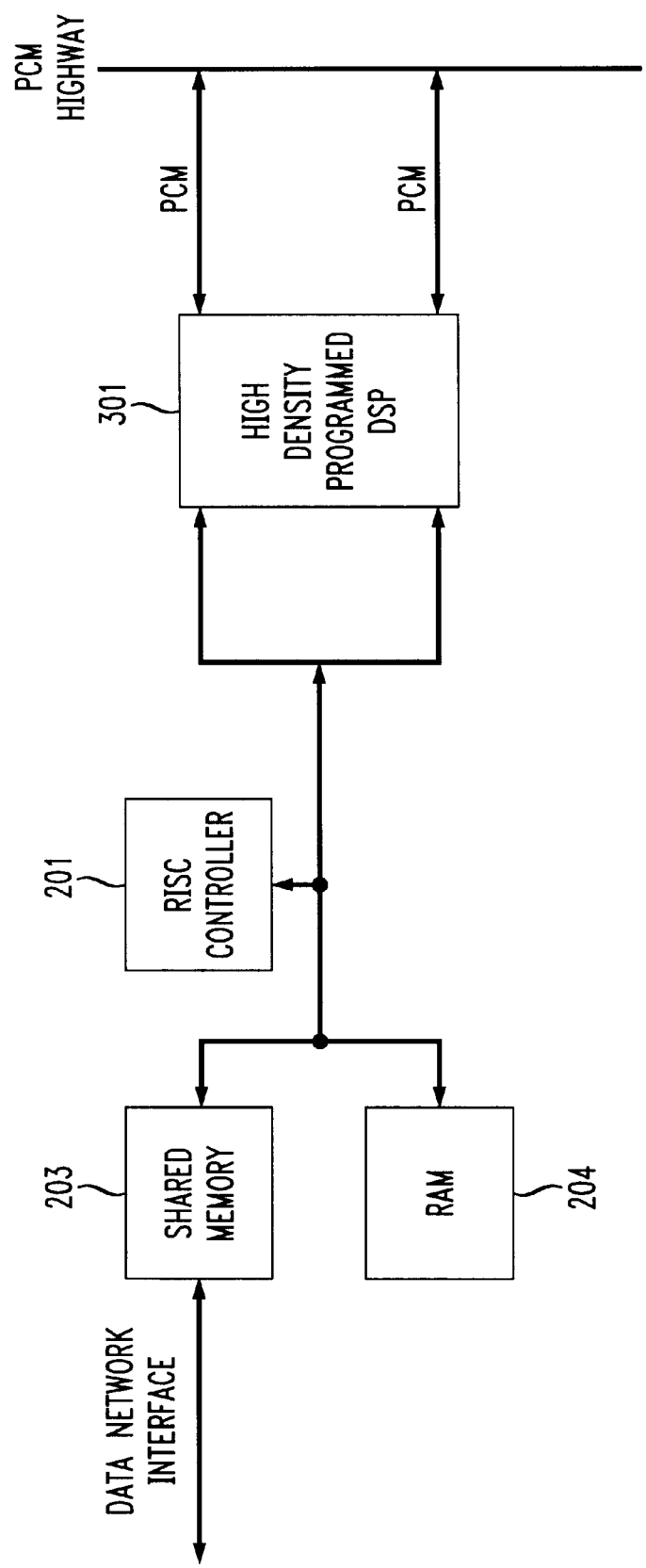
FIG. 3 shows an illustrative block diagram of another prior art multi-port modem.

Shown in FIG. 3 is a further improvement of a multi-port modem where the data-pump functions have also been consolidated in a high density DSP 301 (see the high density DSP design of RSA Communications). As shown, the data-pumps are consolidated, either by repeating the single data-pump implementation multiple times on a single-chip (or package), or by implementing them on a high-performance DSP 301.

In all of the above approaches, the functionality is split between two processors or sets of processors in the conventional manner: The GPP processor (e.g., RISC processor) performing the link-layer protocol functions and the DSP performing the physical layer functions, as shown in FIG. 1.

As previously noted, in contrast to the prior art techniques, in my split-architecture design, the functions performed by the GPP and the DSP are not allocated or consolidated on a link and physical layer basis (as in FIG. 1), but rather are assigned on how efficiently a function can be performed by the GPP or DSP. Thus, in accordance with my split-architecture design, the GPP performs logical and control operations of both the link and physical layer and the DSP performs arithmetic and signal processing operations of the physical layer.

My split-architecture modem implementation can be advantageous due to the ability to have each of the two different processors, GPP and DSP, execute a more homogeneous subset of the overall processing that it is better suited to perform. As a result, performance is improved and the overall modem cost can be lower due to the more optimal matching of program characteristics (memory size and execution time) to an appropriate processor.

DETAILED DESCRIPTION

Figure 4:
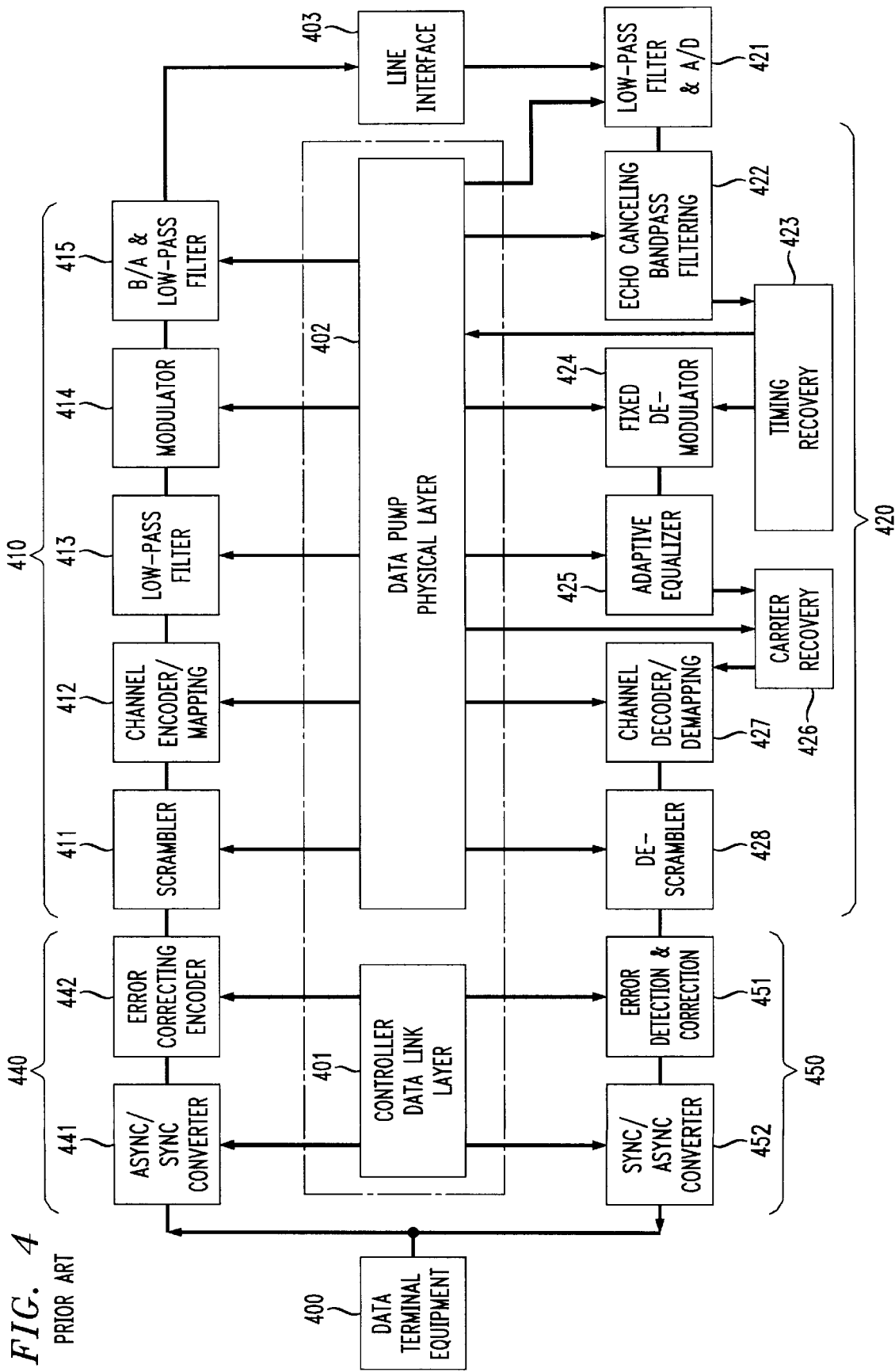
FIG. 4 shows a more detailed block diagram of a prior art modem.

Shown in FIG. 4 is a block diagram of a prior art modem including a GPP 401 for controlling data link functions and a DSP 402 for controlling the physical layer functions. The physical layer is concerned with transmitting and receiving raw bits over a communication channel via line interface 403. Typical physical layer concerns filtering, equalizing, echo canceling, coding/decoding, mapping/demapping, scrambling/descrambling, etc. The data link concerns are the conversion of the raw transmission bits into a data transmission that is in the correct data format and is free of errors. Typical data link layer concerns include framing of the data, acknowledgement signaling, error correction, sync/async conversion, modem state control, etc.

The GPP controller 401 includes a transmitter portion 440 and a receiver portion 450. The transmitter portion includes an async/sync converter 441 and an error correcting encoder 442. The receiver portion includes an error detection and correction circuit 451 and async/sync converter 452.

The DSP data-pump 402 processes data into an analog signal for transmission through a communications channel and processes a received analog signal back to data. The DSP data pump 402 includes a transmitter portion 410 and a receiver portion 420. The transmitter portion 410 of the data-pump receives data from the error correcting encoder 442. The transmitter part 410 typically includes functions such as data scrambling 411, mapping/coding 412 the scrambled data into a sequence of symbols, filtering 413 the symbol sequence into a sequence of samples, modulating 414 the samples, converting the digital samples into an analog signal using digital-to-analog converter 415, and lowpass filtering the analog signal using lowpass filter 415. This analog signal is then transmitted over line interface 403 to the transmission facility.

The receiver part 420 of the data-pump provides essentially the reverses of the transmitter part 410. The receiver part 420 performs the steps of; lowpass filtering and converting the analog signal into a sequence of samples using an analog-to-digital converter 421, echo canceling and bandpass filtering 422, timing recovery 423, fixed demodulating 424, equalizing 425, carrier recovery 426, and decoding 427 the samples into a sequence of symbols, demapping 427 the symbols to data, and descrambling 428 the data to the original data sequence. The data is then passed to the error detecting and correction unit 451 and then processed in Sync/Async converter 452.

The DSP state machine 402 sequences both the transmitter 410 and the receiver 420 through the various states of operation.

I have recognized that these data pump physical layer functions can be split into two groups according to operational characteristics. One group of functions tends to use more memory, uses less computation time, and primarily performs logical operations. The another group uses less memory, uses more computation time, and primarily performs arithmetic operations. The operational characteristics of the two groups of functions are then matched against the operational characteristics of GPP and DSP processors. GPPs tend to be more efficient executing larger programs that primarily perform logic operations and DSPs tend to be more efficient at executing smaller programs that primarily perform repetitive arithmetic operations.

Thus, in accordance with my invention, the architecture of my modem is explicitly split into two functionally based independent processes. A DSP with a relatively small amount of high-speed memory is used to implement the computational intensive part [high number of instructions per second (MIPS) functions] and a GPP with a relatively large amount of slow memory is used to implement the memory intensive part [low MIPS functions]. This arrangement is more efficient, particularly when the GPP and DSP processors themselves are relatively small in physical size as compared to the memories.

Figure 5:
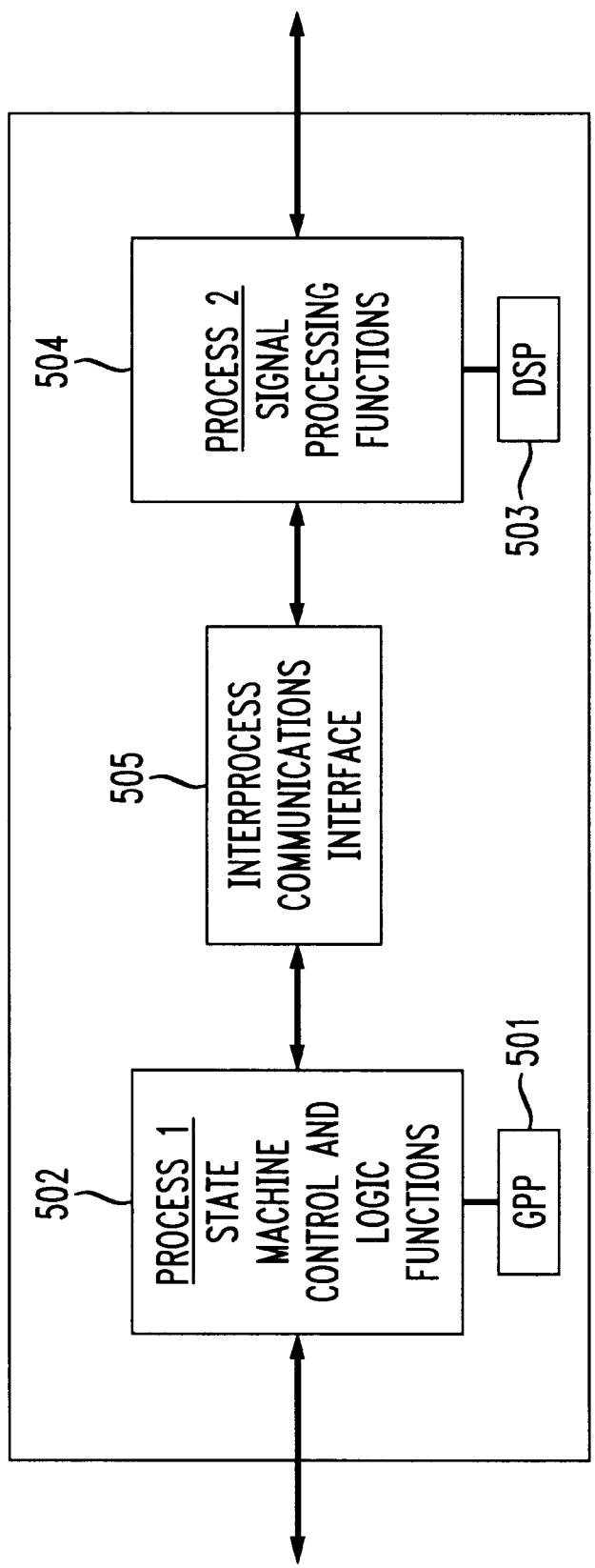
FIG. 5 shows a simplified diagram of my split-architecture modem.

A simplified block diagram of a modem using my split-architecture is illustrated in FIG. 5. As shown GPP 501 controls the process 1 (502) and DSP 503 controls the process 2 (504). The process 1 includes the link layer functions plus the low MIPS functions (logical functions and state machine control of the physical layer). The modem in FIG. 5 has the data-pump 101 split into two processes. Process 1, which has characteristics similar to the data-link layer controller code, is logically grouped with the link layer code for implementation on a GPP, 501, e.g., a microprocessor. Process 2, which has characteristics suited for execution on a DSP, i.e., the high MIPS functions of the physical layer, remains on the DSP 503.

With reference to both FIGS. 5 and 6 the data pump functionality is split as follows:
Process 1:
    Modem state control
    Scrambling/descrambling 411, 428

Coding/decoding 412, 427

Mapping/demapping 412, 427

Process 2:

Transmit/receive filtering 413, 422

Modulation/Demodulation 414, 424

Adaptive Equalization 425

Adaptive Echo Canceling 422

Timing Recovery 423

Carrier Recovery 426

The GPP 501 performs both the above-identified process 1 functions along with the link layer functions below GPP—link layer Async/sync control 441, 452

Error correcting/detecting and correcting 442, 451

Figure 6:
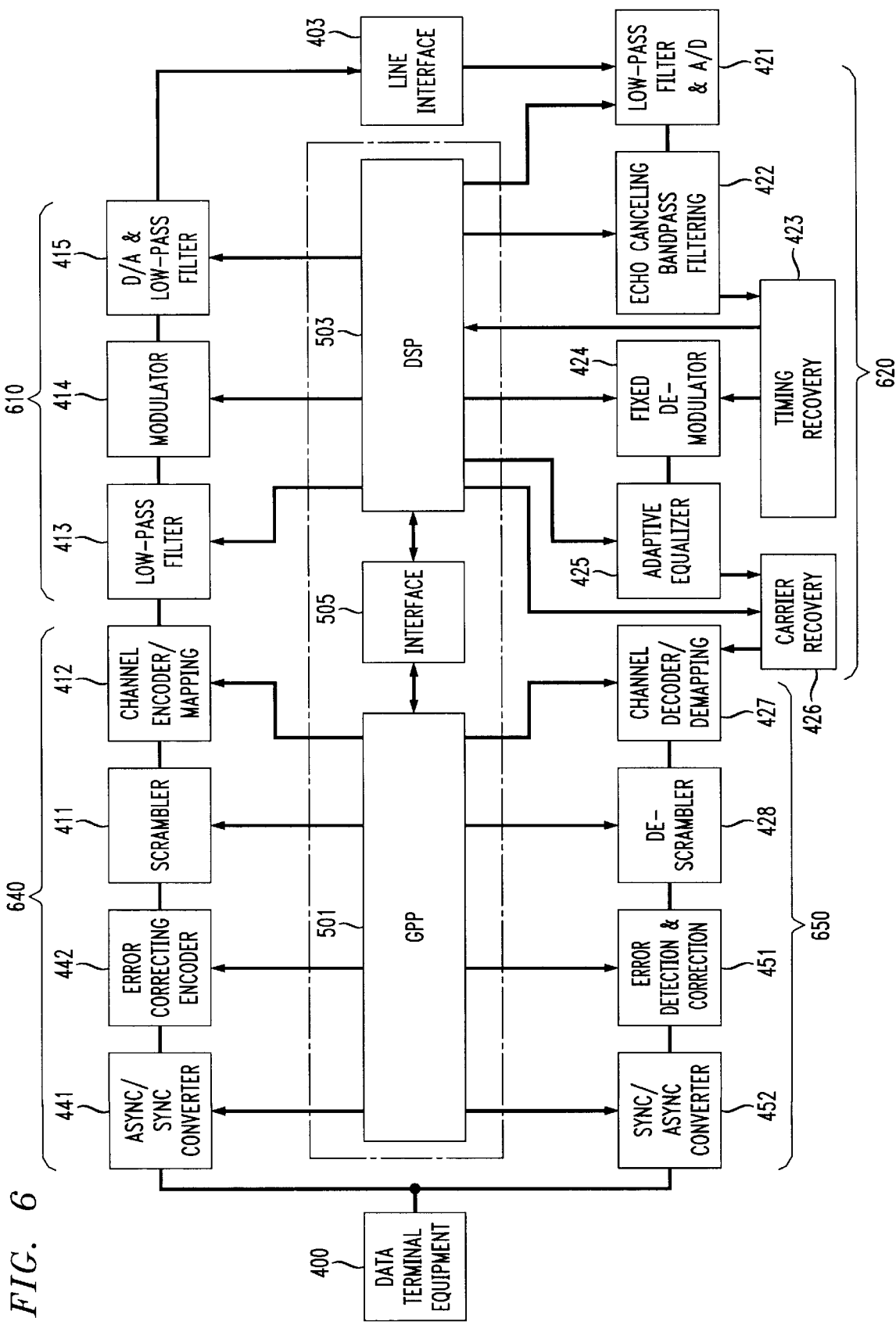
FIG. 6 shows a detailed diagram of my split-architecture modem.

The modem in FIG. 6 thus shows the data-pump 101 function split into two processes. The Process 1 function, which have characteristics similar to the data-link layer functions, is logically grouped together with that code for implementation on GPP 501, e.g., a microprocessor. These functions are grouped into a transmit group 640 and receive group 650. Process 2, which has characteristics suited for execution on a DSP 503, i.e., the high MIPS functions, remains on the DSP 503. These functions are grouped into a transmit group 610 and receive group 620.

The division between the two processes 1 and 2 is at the point in the modem processing where communications (such as data symbols) flow in each direction. The data symbols are communicated between GPP 501 and DSP 503 using through an interprocess communications interface 505. The interface 505 can be implemented as a shared data structure, a communication link, or a dedicated device (e.g., a memory chip).

Note that the exact point where the architectural split occurs is not critical. Ideally, the split must substantially allocate the code to the processor where it most optimally executes.

What has been described is merely illustrative of the application of the principles of the present invention. Other arrangements and methods can be implemented by those skilled in the art without departing from the spirit and scope of the present invention.

What is claimed is:

1. A modem comprising a first processor for performing all logical operations in a modem data link layer protocol and a predetermined set of at least one logical operation selected from a physical layer protocol;

a second processor for performing the remaining logical operations and signal processing operations of the physical layer protocol; and wherein a modem data transmission is processed by first performing the operations of the first processor and then performing the operations of the second processor and wherein a modem data reception is processed by first performing the operations of the second processor and then by performing the operations of the first processor.

2. The modem of claim 1 wherein the first processor performs a plurality of logical operations selected from a first group of physical layer operations including at least modem state control, scrambling/descrambling, coding/decoding, and mapping/demapping.

3. The modem of claim 1 wherein the first processor performs all of the logical operations of the physical layer protocol.

4. The modem of claim 1 further comprising an interface for enabling data symbol communications between the first processor and the second processor.

5. The modem of claim 4 wherein the interface is a logical element selected from a group of elements including at least a shared data structure and a communication link.

6. The modem of claim 4 wherein the interface is a physical element which is a dedicated device.

7. The modem of claim 1 wherein the first processor includes a first memory and the second processor includes a second memory and wherein the first memory is larger and slower than the second memory.

8. A method of operating a modem, comprising the steps of:

(a) performing all logical operations in a modem data link layer protocol and a predetermined fixed set of at least one logical operation of a modem physical layer protocol at a first processor;

(b) performing remaining operations of said modem physical layer protocol at a second processor;

(c) enabling communications between the first processor and the second processor; and wherein during a modem data transmission, step (a) is first performed followed by step (b), and wherein during a modem data reception, step (b) is first performed followed by step (a).

9. A modem comprising a first processor for performing all logical operations in a modem data link layer protocol and a predetermined fixed set of at least one logical operation selected from a first group of modem physical layer operations including at least modem state control, scrambling/descrambling, coding/decoding, and mapping/demapping;

a second processor for performing at least one arithmetic operation selected from a second group of said physical layer operations including at least transmit/receive filtering, equalization, echo canceling, timing recovery, and carrier recovery;

an interface for enabling communications between the first processor and the second processor; and wherein a modem data transmission is processed by first performing the operations of the first processor and then by performing the operations of the second processor and wherein a modem data reception is processed by first performing the operations of the second processor and then performing the operations of the first processor.

10. A method of operating a modem, comprising the steps of:

(a) performing on a first processor, all operations in a modem data link protocol and a physical layer protocol requiring a low instruction processing rate;

(b) performing on a second processor, remaining operations in the modem data link protocol and the physical layer protocol requiring a high instruction processing rate;

c) communicating data symbols between the first processor and the second processor; and wherein during a modem data transmission, step (a) is first performed followed by step (b), and wherein during a modem data reception, step (b) is first performed followed by step (a).

* * * * *